(12) United States Patent
Namioka et al.

(10) Patent No.: US 7,200,084 B2
(45) Date of Patent: Apr. 3, 2007

(54) APPARATUS FOR DISCRIMINATING OPTICAL RECORDING MEDIUM AND METHOD FOR DISCRIMINATING OPTICAL RECORDING MEDIUM

(75) Inventors: Takashi Namioka, Tokyo (JP); Yasufumi Takasugi, Tokyo (JP); Kazuo Fukunaga, Tokyo (JP); Toshikazu Hosobuchi, Tokyo (JP); Giichi Shibuya, Tokyo (JP); Hideki Hirata, Tokyo (JP); Kazuki Suzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 123 days.

(21) Appl. No.: 10/511,623

(22) PCT Filed: Apr. 18, 2003

(86) PCT No.: PCT/JP03/04953

§ 371 (c)(1),
(2), (4) Date: Oct. 18, 2004

(87) PCT Pub. No.: WO03/090214

PCT Pub. Date: Oct. 30, 2003

(65) Prior Publication Data

US 2005/0169141 A1    Aug. 4, 2005

(30) Foreign Application Priority Data

Apr. 19, 2002 (JP) .............................. 2002-117039

(51) Int. Cl.
*G11B 5/58* (2006.01)

(52) U.S. Cl. .................. 369/53.2; 369/13.39; 369/126
(58) Field of Classification Search .................. None
See application file for complete search history.

(56) References Cited

U.S. PATENT DOCUMENTS 4,477,819 A    10/1984    Lee et al. .................. 346/76 L (Continued)

FOREIGN PATENT DOCUMENTS

EP    1 329 878 A1    7/2003

(Continued)

OTHER PUBLICATIONS

Translation of JP 10-143986.*

*Primary Examiner*—Wayne Young
*Assistant Examiner*—Minerva Rivero
(74) *Attorney, Agent, or Firm*—Seed IP Law Group PLLC (57) ABSTRACT

The present invention provides a method and an apparatus for discriminating the type of an optical recording medium and the number of recording layers in the medium. The apparatus includes a first electrode and a second electrode placed in the vicinity of a light transmission layer of the recording medium, an alternating current signal generation circuit for applying an alternating current A to the first electrode, a detection circuit for detecting the level of an alternating current B appearing at the second electrode, and a control circuit for controlling the operations of the alternating current signal generation circuit and the detection circuit, and a table provided in the control circuit.

9 Claims, 8 Drawing Sheets

U.S. PATENT DOCUMENTS

| | | | |
|---|---|---|---|
| 4,587,553 A | 5/1986 | Watanabe et al. | 358/64 |
| 5,389,475 A * | 2/1995 | Yanagisawa et al. | 430/19 |
| 5,458,941 A | 10/1995 | Hintz | 428/64.4 |
| 5,787,061 A * | 7/1998 | Tsuchiya et al. | 369/44.29 |
| 6,355,326 B1 | 3/2002 | Lee et al. | 428/64.1 |

FOREIGN PATENT DOCUMENTS

| | | | |
|---|---|---|---|
| JP | 10055601 | | 2/1998 |
| JP | 10-143986 | * | 5/1998 |
| JP | 10143986 | | 5/1998 |

* cited by examiner

APPARATUS FOR DISCRIMINATING OPTICAL RECORDING MEDIUM AND METHOD FOR DISCRIMINATING OPTICAL RECORDING MEDIUM

This application is a 371 of PCT/JP03/04953 Apr. 18, 2003

BACKGROUND OF THE INVENTION

The present invention relates to an apparatus for discriminating an optical recording medium and a method for discriminating an optical recording medium, and particularly, to an apparatus for discriminating an optical recording medium and a method for discriminating an optical recording medium which can quickly discriminate the kind of an optical recording medium.

DESCRIPTION OF THE PRIOR ART

Optical recording media such as the CD, DVD and the like have been widely used as recording media for recording digital data and next-generation type optical recording media having large data recording capacity and an extremely high data transfer rate have recently been actively developed.

In order to develop an optical recording medium having large data recording capacity and an extremely high data transfer rate, it is required to reduce the diameter of the laser beam spot used to record and reproduce data to a very small size.

In order to reduce the laser beam spot diameter, it is necessary to increase the numerical aperture of the objective lens for condensing the laser beam to 0.7 or more, for example, to about 0.85, and to shorten the wavelength of the laser beam to 450 nm or less, for example, to about 400 nm.

However, if the numerical aperture of the objective lens for condensing the laser beam is increased, then, as shown by Equation (1), the permitted tilt error of the optical axis of the laser beam to the optical recording medium, namely, the tilt margin T, has to be greatly decreased.

$$T \propto \frac{\lambda}{d \cdot NA^3} \quad (1)$$

In Equation (1), $\lambda$ is the wavelength of the laser beam used for recording and reproducing data and d is the thickness of the light transmission layer through which the laser beam transmits.

As apparent from Equation (1), the tilt margin T decreases as the numerical aperture of the objective lens increases and increases as the thickness of the light transmission layer decreases. Therefore, decrease of the tilt margin T can be effectively prevented by making the thickness of the light transmission layer thinner.

On the other hand, a wave aberration coefficient W representing coma is defined by Equation (2).

$$W = \frac{d \cdot (n^2 - 1) \cdot n^2 \cdot \sin\theta \cdot \cos\theta \cdot (NA)^3}{2\lambda(n^2 - \sin^2\theta)^{\frac{5}{2}}} \quad (2)$$

In Equation (2), n is the refractive index of the light transmission layer and $\theta$ is the tilt of the optical axis of the laser beam.

As apparent from Equation (2), coma can also be very effectively suppressed by making the thickness of the light transmission layer thinner.

For these reasons, it has been proposed that the thickness of the light transmission layer of the next-generation type optical recording medium should be reduced as far as about 100 µm in order to ensure sufficient tilt margin and suppress coma.

However, since next-generation type optical recording media are now being developed, it is expected that two or more kinds of optical recording media will be marketed together in the future.

Therefore, it may, for example, be required to use a laser beam having a wavelength of 430 nm for recording data in and reproducing data from one kind of optical recording media and simultaneously required to use a laser beam having a wavelength of 380 nm for recording data in and reproducing data from another kind of optical recording media.

Further, it is conceivable that one kind of optical recording media will include a light transmission layer having a thickness of 120 µm and another kind of optical recording media may include a light transmission layer having a thickness of 50 µm.

On the other hand, even if two or more kinds of optical recording media are marketed concurrently, it can be assumed that, as in the case of the CD and DVD, the outer shapes and sizes will be standardized.

Therefore, a data recording and reproducing apparatus (drive) for recording data in and reproducing data from a next-generation type optical recording medium will be required to be capable of discriminating among two or more kinds of optical recording media.

It is possible to discriminate the kind of an optical recording medium set in a data recording and reproducing apparatus by projecting a laser beam thereonto.

For example, in the case where an optical recording medium in which data have to be recorded and reproduced using a laser beam having a wavelength of 430 nm and an optical recording medium in which data have to be recorded and reproduced using a laser beam having a wavelength of 380 nm are concurrently marketed, it is possible to discriminate whether an optical recording medium set in a data recording and reproducing apparatus is an optical recording medium in which data have to be recorded and reproduced using a laser beam having a wavelength of 430 nm or an optical recording medium in which data have to be recorded and reproduced using a laser beam having a wavelength of 380 nm by irradiating the optical recording medium with a laser beam having a wavelength of 430 nm or 380 nm and judging whether or not a reproduced normal signal can be obtained.

Specifically, in the case of irradiating an optical recording medium with a laser beam having a wavelength of 430 nm and obtaining a normal reproduced signal, the optical recording medium is judged to be an optical recording medium in which data have to be recorded and reproduced using a laser beam having a wavelength of 430 nm and data can be recorded in or reproduced from the optical recording medium without switching the laser beam to a laser beam having a different wavelength. To the contrary, in the case where an optical recording medium is irradiated with a laser beam having a wavelength of 430 nm but a normal reproduced signal cannot be obtained, the optical recording medium is judged to be an optical recording medium in which data have to be recorded and reproduced using a laser beam having a wavelength of 380 nm and it is necessary to switch the laser beam to one having a wavelength of 380 nm and record data in or reproduce data from the optical recording medium.

However, in the case of discriminating the kind of an optical recording medium by projecting a laser beam onto the optical recording medium in this manner, since it is necessary to conduct operations such focus searching and the like, a long time is required for discriminating the kind of the optical recording medium, and when the laser beam has to be switched to one having a different wavelength, a long period is required between the time when the optical recording medium is set in the drive and the time when data can be actually recorded in or reproduced from the optical recording medium.

SUMMARY OF THE INVENTION

It is therefore an object of the present invention to provide an apparatus for discriminating an optical recording medium and a method for discriminating an optical recording medium which can quickly discriminate the kind of an optical recording medium.

The above object of the present invention can be accomplished by an apparatus for discriminating an optical recording medium comprising at least a substrate, a conductive layer formed on the substrate and a light transmission layer formed on the conductive layer, the apparatus for discriminating an optical recording medium comprising a first electrode and a second electrode which can be disposed in the vicinity of a surface of the light transmission layer disposed on a side opposite from the substrate side, a means for applying a signal to the first electrode, and a means for detecting a signal appearing at the second electrode.

The above object of the present invention can be also accomplished by an apparatus for discriminating an optical recording medium constituted so as to be able to discriminate between a first kind of optical recording medium comprising at least a substrate, a conductive layer formed on the substrate and a light transmission layer formed on the conductive layer and containing a first material and a second kind of optical recording medium comprising at least a substrate, a conductive layer formed on the substrate and a light transmission layer formed on the conductive layer and containing a second material different from the first material, the apparatus for discriminating optical recording media comprising a first electrode and a second electrode which can be disposed in the vicinity of a surface of the light transmission layer disposed on a side opposite from the substrate side, a means for applying a signal to the first electrode, and a means for detecting a signal appearing at the second electrode.

The above object of the present invention can be also accomplished by an apparatus for discriminating an optical recording medium comprising at least a substrate, at least one recording layer formed on the substrate and a light transmission layer formed on the recording layer constituted so as to be able to discriminate the number of the recording layers included in an optical recording medium, the apparatus for discriminating an optical recording medium comprising a first electrode and a second electrode which can be disposed in the vicinity of a surface of the light transmission layer disposed on a side opposite from the substrate side, a means for applying a signal to the first electrode, and a means for detecting a signal appearing at the second electrode.

The above object of the present invention can be also accomplished by a method for discriminating an optical recording medium comprising at least a substrate, a conductive layer formed on the substrate and a light transmission layer formed on the conductive layer, the method for discriminating optical recording media comprising steps of disposing a first electrode and a second electrode in the vicinity of a surface of the light transmission layer disposed on a side opposite from the substrate side, applying a signal to the first electrode, and detecting a signal appearing at the second electrode, thereby discriminating a kind of an optical recording medium.

The above object of the present invention can be also accomplished by a method for discriminating an optical recording medium constituted so as to be able to discriminate between a first kind of optical recording medium comprising at least a substrate, a conductive layer formed on the substrate and a light transmission layer formed on the conductive layer and containing a first material and a second kind of optical recording medium comprising at least a substrate, a conductive layer formed on the substrate and a light transmission layer formed on the conductive layer and containing a second material different from the first material, the method for discriminating an optical recording medium comprising steps of disposing a first electrode and a second electrode in the vicinity of a surface of the light transmission layer disposed on a side opposite from the substrate side, applying a signal to the first electrode, and detecting a signal appearing at the second electrode, thereby discriminating whether an optical recording medium is the first kind of an optical recording medium or the second kind of an optical recording medium.

The above object of the present invention can be also accomplished by a method for discriminating an optical recording medium comprising at least a substrate, at feast one recording layer formed on the substrate and a light transmission layer formed on the recording layer, which is constituted so as to be able to discriminate the number of the recording layers of an optical recording medium, the method for discriminating an optical recording medium comprising steps of disposing a first electrode and a second electrode in the vicinity of a surface of the light transmission layer disposed on a side opposite from the substrate side, applying a signal to the first electrode, and detecting a signal appearing at the second electrode, thereby discriminating the number of the recording layers included in an optical recording medium.

In this specification, the statement that the first electrode and the second electrode can be disposed in the vicinity of the surface of the light transmission layer includes a case where the first electrode and the second electrode can be disposed close to the surface of the light transmission layer and a case where the first electrode and the second electrode can be disposed in contact with the surface of the light transmission layer and the statement that the first electrode and the second electrode are disposed in the vicinity of the surface of the light transmission layer includes the case of locating the first electrode and the second electrode close to the surface of the light transmission layer and the case of locating the first electrode and the second electrode in contact with the surface of the light transmission layer.

According to the present invention, if two or more optical recording media which differ in the layer configuration between a laser beam incidence plane and a conductive layer formed on the substrate or which differ in the material of the layers are concurrently marketed, it is possible to quickly discriminate each kind of optical recording medium from the others and it is therefore possible to markedly shorten time required for actually recording data in or reproducing data from the optical recording medium after the optical recording medium is set in a drive.

BRIEF DESCRIPTION OF THE DRAWINGS

FIG. 2(a) shows a structure of an optical recording medium to be discriminated in the case where it is constituted as a write-once type optical recording medium or a data rewritable type optical recording medium and FIG. 2(b) shows a structure of an optical recording medium to be discriminated in the case where it is constituted as a ROM type optical recording medium.

FIG. 4(a) is a diagram showing a circuit formed in the case where an optical recording medium is constituted as a write-once type optical recording medium, FIG. 4(b) a diagram showing a circuit formed in the case where an optical recording medium is constituted as a data rewritable type optical recording medium and a phase change film constituting a recording layer is formed of a conductive material, FIG. 4(c) a diagram showing a circuit formed in the case where an optical recording medium is constituted as a ROM type optical recording medium, and FIG. 4(d) is a diagram showing a circuit formed in the case where an optical recording medium is constituted as a data rewritable type optical recording medium and a phase change film constituting an L1 recording layer and an L0 recording layer is formed of a conductive material.

DESCRIPTION OF THE PREFERRED EMBODIMENTS

Preferred embodiments of the present invention will now be described with reference to accompanying drawings.

Figure 1:
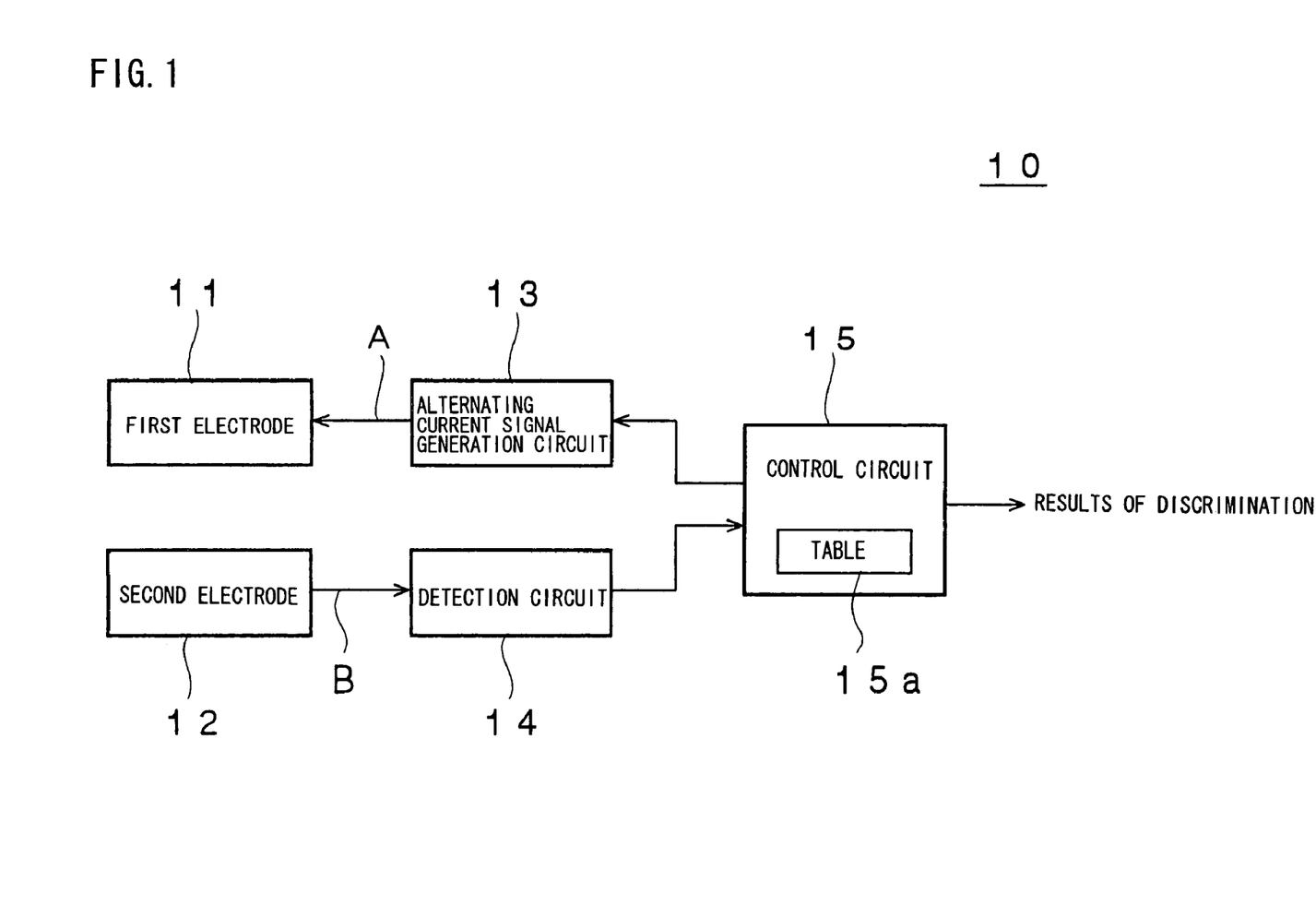
FIG. 1 is a block diagram showing an apparatus for discriminating an optical recording medium that is a preferred embodiment of the present invention.

As shown in FIG. 1, an apparatus 10 for discriminating an optical recording medium that is a preferred embodiment of the present invention includes a first electrode 11 and a second electrode 12, an alternating current signal generation circuit 13 for applying an alternating current signal to the first electrode 11, a detection circuit 14 for detecting the level of an alternating current signal B appearing at the second electrode 12, and a control circuit 15 for controlling the operations of the alternating current signal generation circuit 13 and the detection circuit 14, and a table 15a provided in the control circuit 15.

Figure 2:
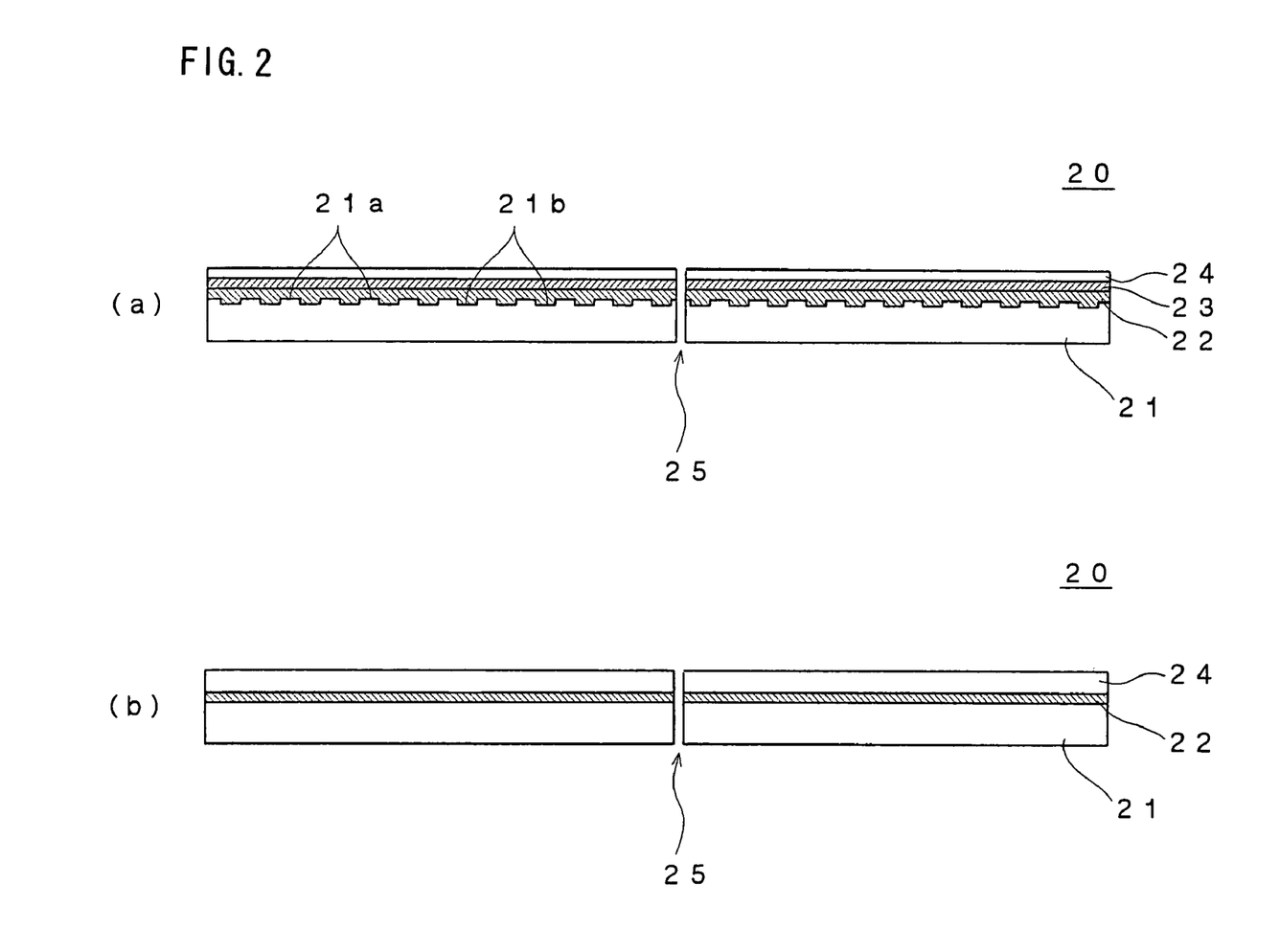
FIG. 2 is a schematic cross-sectional view showing an optical recording medium to be discriminated by an apparatus for discriminating an optical recording medium that is a preferred embodiment of the present invention where

FIG. 2 is a schematic cross-sectional view showing an optical recording medium to be discriminated by the apparatus for discriminating an optical recording medium that is this preferred embodiment of the present invention where FIG. 2(a) shows the structure of an optical recording medium to be discriminated in the case where it is constituted as a write-once type optical recording medium or a data rewritable type optical recording medium and FIG. 2(b) shows the structure of an optical recording medium to be discriminated in the case where it is constituted as a ROM type optical recording medium.

In this embodiment, in the case where an optical recording medium is constituted as a write-once type optical recording medium or a data rewritable type optical recording medium as shown in FIG. 2(a), the optical recording medium 20 includes a substrate 21, a reflective layer 22 formed on the substrate 21, a recording layer 23 formed on the reflective layer 22, and a light transmission layer 24 formed on the recording layer 23, and the center portion of the optical recording medium 20 is formed with a hole 25.

In the thus constituted optical recording medium 20, a laser beam is projected onto the optical recording medium 20 from the side of the light transmission layer 24, thereby recording data in or reproducing data from the optical recording medium 20.

The support substrate 21 serves as a support for ensuring mechanical strength required for the optical recording medium 20.

The material used to form the substrate 21 is not particularly limited insofar as the support substrate 21 can serve as the support of the optical recording medium 20. The support substrate 21 can be formed of glass, ceramic, resin or the like. Among these, resin is preferably used for forming the support substrate 21 since resin can be easily shaped. Illustrative examples of resins suitable for forming the support substrate 21 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the support substrate 21 from the viewpoint of easy processing, optical characteristics and the like and in this embodiment, the support substrate 21 is formed of polycarbonate resin.

In this embodiment, the support substrate 21 has a thickness of about 1.1 mm.

As shown in FIG. 2(a), grooves 21a and lands 21b are alternately formed on the surface of the support substrate 21. The grooves 21a and/or lands 21b serve as a guide track for the laser beam when data are to be recorded or when data are to be reproduced.

The reflective layer 22 serves to reflect the laser beam entering via the light transmission layer 24 so as to emit it from the light transmission layer 24.

The thickness of the reflective layer 22 is not particularly limited but it is preferable to form the reflective layer 22 so as to have a thickness of 10 nm to 300 nm and is more preferable to form it so as to have a thickness of 20 nm to 200 nm.

The material for forming the reflective layer 22 is not particularly limited insofar as it can reflect a laser beam, and the reflective layer 22 can be formed of Mg, Al, Ti, Cr, Fe, Co, Ni, Cu, Zn, Ge, Ag, Pt, Au and the like. Among these materials, it is preferable to form the reflective layer 22 of a metal material having a high reflectivity, such as Al, Au, Ag, Cu or alloy containing at least one of these metals, such as alloy of Al and Cu. In this embodiment, the reflective layer 22 is formed of a metal such as Al, Au, Ag, Cu or the like.

In this specification, a layer such as a reflective layer 22 having conductivity is sometimes referred to as "a conductive layer."

The recording layer 23 is generally formed of an organic dye in the case where the optical recording medium 20 is constituted as a write-once type optical recording medium and the recording layer 23 is generally constituted by a phase change film formed of a phase change material and dielectric films sandwiching the phase change film in the case where the optical recording medium 20 is constituted as a data rewritable type optical recording medium.

In a write-once type optical recording medium, data are recorded in the recording layer 23 by transforming a predetermined region of organic dye contained in the recording layer 23 using a laser beam.

On the other hand, in a data rewritable type optical recording medium, data are recorded in the recording layer 23 by changing the phase of the phase change film contained in the recording layer 23 from a crystalline state to an amorphous state using a laser beam.

In the case where the optical recording medium 20 is constituted as a data rewritable type optical recording medium, it is general to form the phase change film contained in the recording layer 23 of a conductive material and the recording layer 23 generally corresponds to "a conductive layer."

The light transmission layer 24 serves to transmit the laser beam and in a next-generation type optical recording medium, the light transmission layer 24 is formed very much thinner than that of a CD or DVD so that it is normally formed so as to have a thickness of 10 μm to 300 μm.

The material for forming the light transmission layer 24 depends upon the kind of an optical recording medium 20 but a dielectric material such as ultraviolet ray curable resin, polycarbonate, polyolefin or the like can be used for forming the light transmission layer 24.

To the contrary, in the case where the optical recording medium 20 to be discriminated is constituted as a ROM type optical recording medium, data are recorded by pre-pits (not shown) formed on the surface of the substrate 21 when the optical recording medium 20 is fabricated and as shown in FIG. 2(b), no groove and land are formed on the surface of the substrate 21 and no recording layer 23 is formed.

It is expected that a standard will be established regarding the material and thickness of the substrate 21 of a next-generation type optical recording medium 20 having the above described structure but that various optical recording media provided with layers such as the recording layer 23, the light transmission layer 24 and the like that are formed of different materials and have different thicknesses will be proposed and come into practical use.

In view of the above, in a next-generation type optical recording medium, it is indispensable to discriminate the kind thereof prior to recording data therein or reproducing data therefrom and, therefore, the apparatus 10 for discriminating an optical recording medium is constituted so as to be able to discriminate the kind of a next-generation type optical recording medium.

Figure 3:
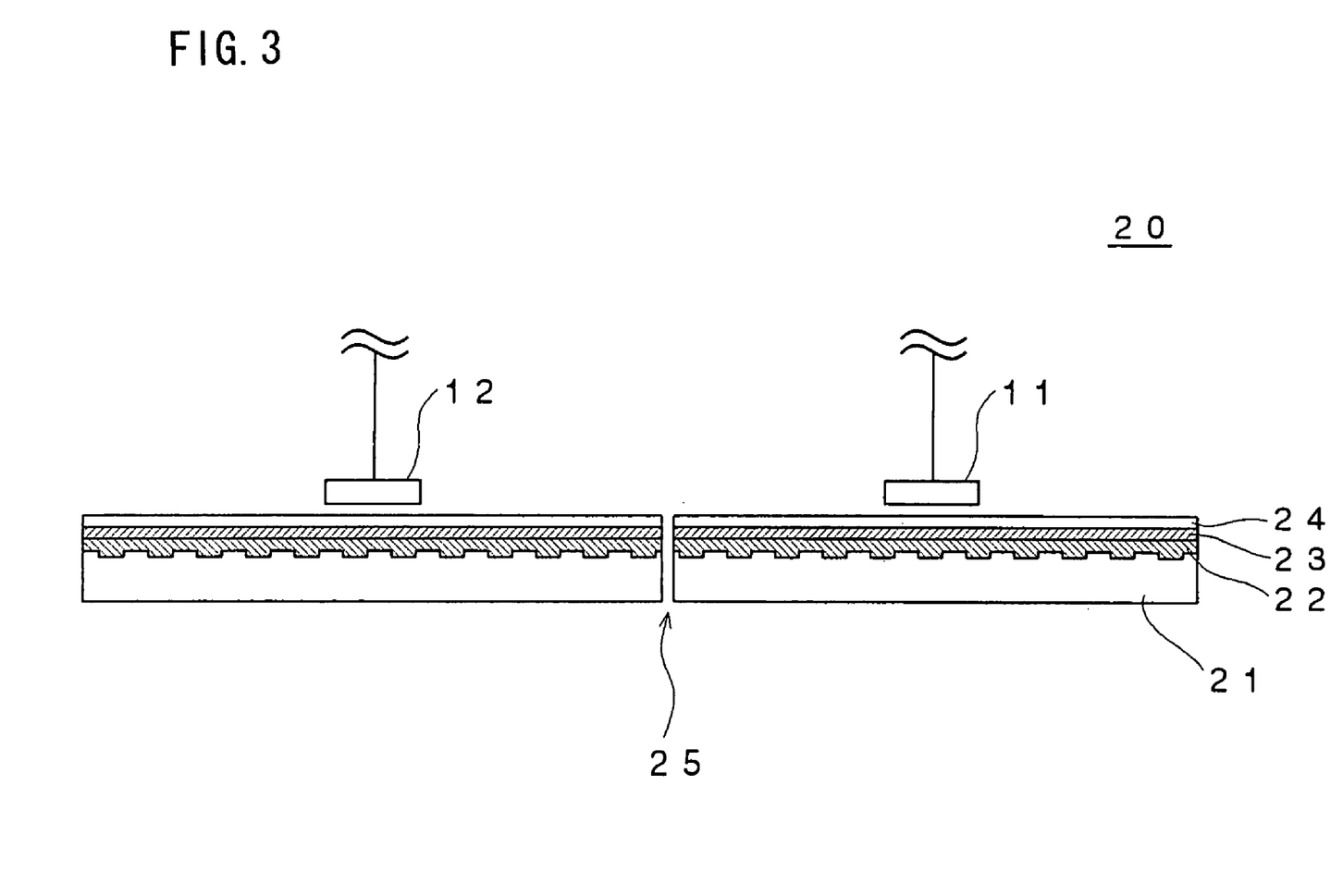
FIG. 3 is a schematic cross-sectional view showing a method for discriminating the kind of an optical recording medium using an apparatus for discriminating an optical recording medium.

In the case where the kind of an optical recording medium 20 is to be discriminated using the apparatus 10 for discriminating an optical recording medium according to this embodiment, as shown in FIG. 3, the first electrode 11 and the second electrode 12 are first disposed at positions close to the light transmission layer 24 of the optical recording medium 20 or positions in contact therewith.

Figure 4:
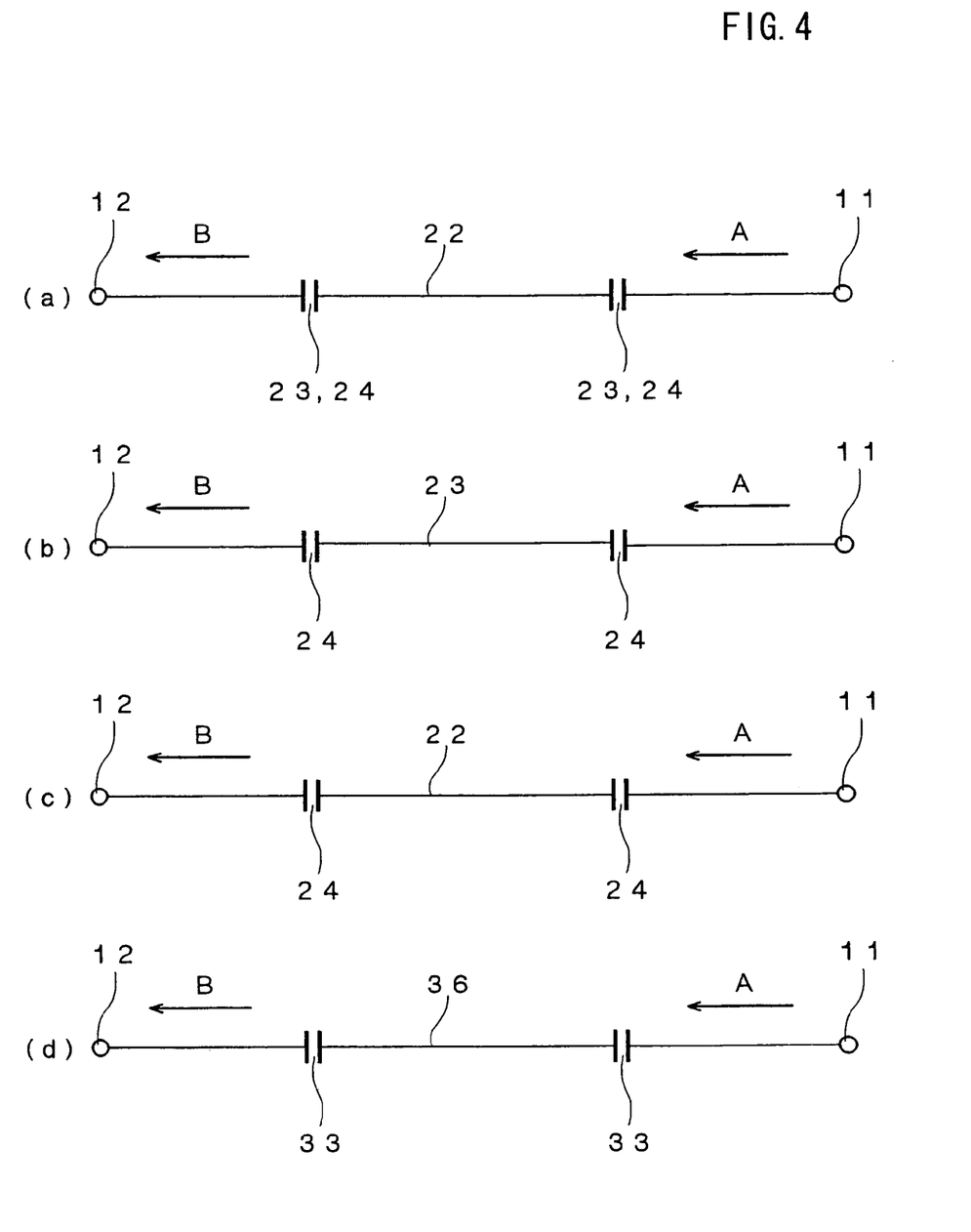
FIG. 4 is a set of diagrams each showing a circuit formed between a first electrode and a second electrode where

As a result, in the case where the optical recording medium 20 is constituted as a write-once type optical recording medium, since the light transmittance layer 24 is made of a dielectric material and the reflective layer 22 is made of a metal, the circuit shown in FIG. 4(a) is formed between the first electrode 11 and the second electrode 12. On the other hand, in the case where the optical recording medium 20 is constituted as a data rewritable type optical recording medium and the phase change film included in the recording layer 23 is made of a conductive material, the circuit shown in FIG. 4(b) is formed between the first electrode 11 and the second electrode 12.

To the contrary, in the case where the optical recording medium 20 is constituted as a ROM type optical recording medium, the circuit shown in FIG. 4(c) is formed between the first electrode 11 and the second electrode 12.

In this manner, when the first electrode 11 and the second electrode 12 have been disposed at positions close to the light transmission layer 24 of the optical recording medium 20 or positions in contact therewith, whereby one of the above mentioned circuits is formed between the first electrode 11 and the second electrode 12, an alternating current signal A generated by the alternating current signal generation circuit 13 is applied to the first electrode 11 under control of the control means 15.

As a result, the alternating current signal A is transferred to the second electrode 12 via the circuit shown in FIG. 4(a), the circuit shown in FIG. 4(b) or the circuit shown in FIG. 4(c).

Therefore, in the case where the optical recording medium 20 is constituted as a write-once type optical recording medium and the circuit shown in FIG. 4(a) is formed between the first electrode 11 and the second electrode 12, an alternating current signal B appearing at the second electrode 12 varies depending upon the materials and thicknesses of the recording layer 23 and the light transmission layer 24, in particular, the dielectric constant and thickness of the recording layer 23.

To the contrary, in the case where the optical recording medium 20 is constituted as a data rewritable type optical recording medium, the phase change film included in the recording layer 23 is made of a conductive material and the circuit shown in FIG. 4(b) is formed between the first electrode 11 and the second electrode 12, and the case where in the case where the optical recording medium 20 is constituted as a ROM type optical recording medium and the circuit shown in FIG. 4(c) is formed between the first electrode 11 and the second electrode 12, the alternating current signal B appearing at the second electrode 12 varies depending upon the material and thickness of the light transmission layer 24.

Therefore, if the level of an alternating current signal B to be obtained for each kind of optical recording media 20 is ascertained in advance and stored in the table 15a in the control circuit 15, the kind of optical recording media 20 can be discriminated from the level of the alternating current signal B actually detected by the detection circuit 14 by referring to the table 15a in the control circuit 15. Accordingly, if such an apparatus 10 for discriminating an optical recording medium is mounted on the data recording and reproducing apparatus (drive) in advance, it is possible to quickly discriminate the kind of the optical recording medium set in the data recording and reproducing apparatus before projection of a laser beam is started.

According to this embodiment, in the case where two or more kinds of next-generation type optical recording media having recording layers 23 made of different materials are concurrently marketed, the time required for recording data in or reproducing data from the optical recording medium 20 after it is set in the data recording and reproducing apparatus can be considerably shortened because it is possible to quickly discriminate the kind of the optical recording medium set in a data recording and reproducing apparatus without conducting the laser beam focusing operation and switching operation of a laser beam.

Further, although the structures, materials and thicknesses of layers disposed between the surface of the light transmission layer 24 and the reflective layer 20 differ between different kinds of next-generation type optical recording media, it is nevertheless almost impossible to discriminate the kind of the optical recording medium by locating the first electrode 11 and the second electrode 12 at positions close to the substrate 21 or positions in contact therewith and applying an alternating current signal A to the first electrode 11. This is because the level of the alternating current signal B appearing at the second electrode 12 will be substantially the same independently of the kind of a next-generation type optical recording medium 20 owing to the fact that the layer disposed between the surface of the substrate 21 and the reflective layer 22 has substantially the same thickness independently of the kind of a next-generation type optical recording medium 20 and consists solely of the substrate 21 made of polycarbonate resin, and. However, in this embodiment, the first electrode 11 and the second electrode 12 are located at positions close to the surface of the light transmission layer 24 disposed on the side opposite from the substrate 21 or positions in contact therewith and an alternating current signal is applied to the first electrode 11. Therefore, it is possible to accurately discriminate the kind of the optical recording medium 20 by detecting the level of the alternating current signal B appearing at the second electrode 12.

Figure 5:
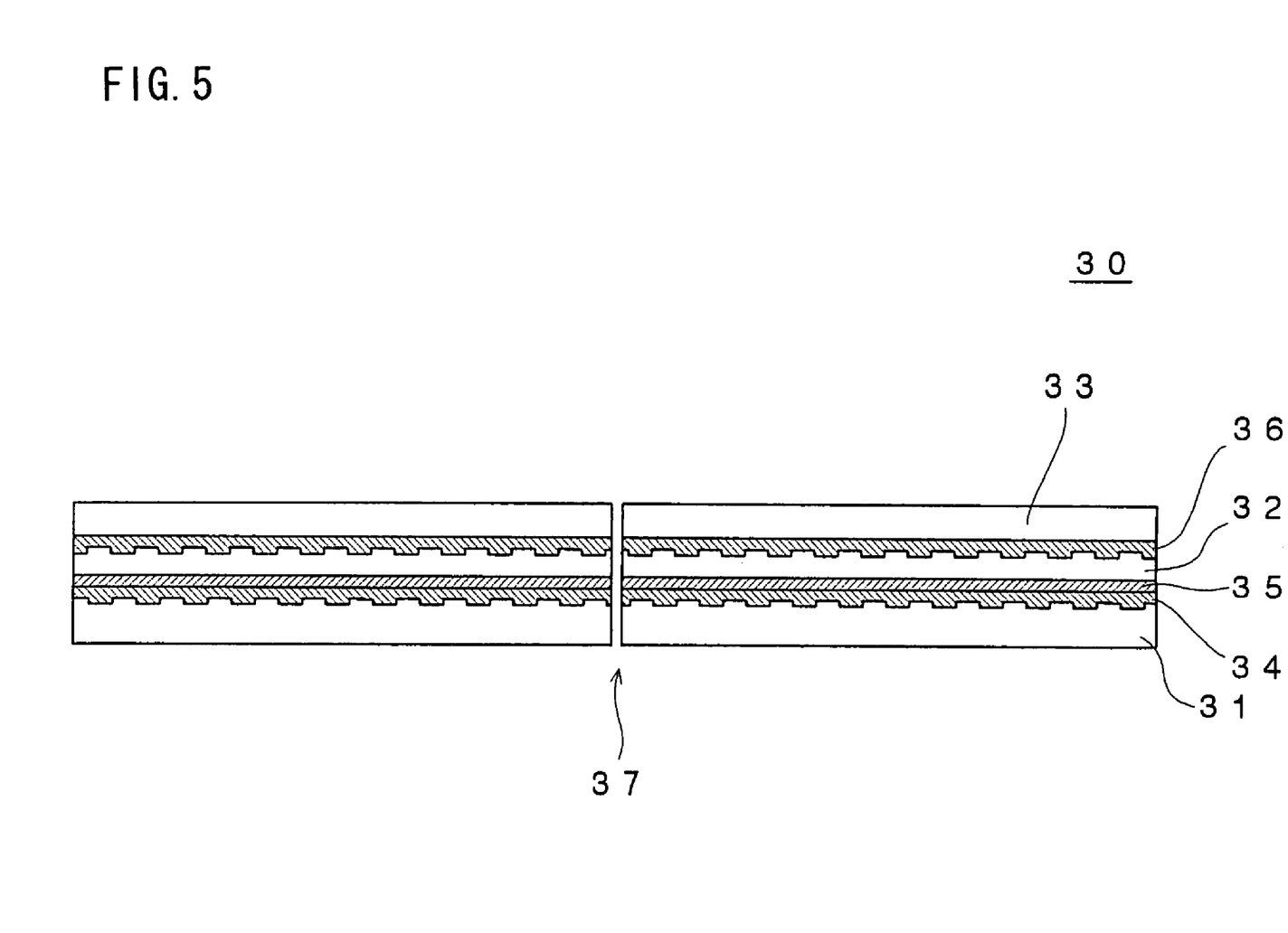
FIG. 5 is a schematic cross-sectional view showing a structure of a next-generation type optical recording medium including two recording layers and to be discriminated in a preferred embodiment of the present invention.

FIG. 5 is a schematic cross-sectional view showing a structure of a next-generation type optical recording medium including two recording layers and to be discriminated in another preferred embodiment of the present invention.

The next-generation type optical recording medium 30 shown in FIG. 5 includes a substrate 31, an intermediate layer 32, a light transmission layer 33, a reflective layer 34 formed between the substrate 31 and the intermediate layer 32, an L1 recording layer 35 and an L0 recording layer 36 formed between the intermediate layer 32 and the light transmission layer 33, and the center portion of the optical recording medium 30 is formed with a hole 37.

In the thus constituted optical recording medium 30, a laser beam is projected onto the optical recording medium 30 from the side of the light transmission layer 33, thereby recording data in or reproducing data from the optical recording medium 30.

The support substrate 31 serves as a support for ensuring mechanical strength required for the optical recording medium 30 and in the optical recording medium 30 shown in FIG. 5, the substrate 31 is made of polycarbonate resin and has a thickness of about 1.1 mm.

The intermediate layer 32 serves to space the L0 recording layer 35 and the L1 recording layer 36 apart by a sufficient distance and is normally formed so as to have a thickness of about 10 µm to 50 µm.

As the material for forming the intermediate layer 32, a dielectric material such as ultraviolet ray curable resin, polycarbonate, polyolefin or the like can be selected.

Since the optical recording medium 30 shown in FIG. 5 thus includes the intermediate layer 32, the light transmission layer 33 is formed thinner than the light transmission layer 24 of the optical recording medium 20 by a thickness corresponding to that of the intermediate layer 32.

In the optical recording medium 30, no reflective layer for the L0 recording layer 36 is provided so that a sufficient amount of a laser beam can reach the L1 recording layer 35.

In the case where the optical recording medium 30 is constituted as a data rewritable type optical recording medium and phase change films included in the L1 recording layer 35 and the L0 recording layer 36 are formed of a conductive material, the circuit shown in FIG. 4(d) is formed between the first electrode 11 and the second electrode 12 when the first electrode 11 and the second electrode 12 are located at positions close to the light transmission layer 33 of the optical recording medium 30 or positions in contact therewith.

In the optical recording medium 30, the L0 recording layer 36 constitutes the closest conductive layer to the light incidence plane. Therefore, as shown in FIG. 4(d), the intermediate layer 32, the L1 recording layer 35 and the like disposed below the L0 recording layer 35 do not substantially influence the circuit formed between the first electrode 11 and the second electrode 12. As a result, the circuit constants of the circuit formed are determined substantially by the material and the thickness of the light transmission layer 33 of the optical recording medium 30.

In this case, since the light transmission layer 33 of the optical recording medium 30 is formed thinner than the light transmission layer 24 of the optical recording medium 20 shown in FIG. 2(a), the circuit shown in FIG. 4(d) has different circuit constants from those of the circuit shown in FIG. 4(a).

Therefore, in the case where the optical recording medium 30 including the two recording layer 35, 36 and shown in FIG. 5 and the optical recording medium 20 including the single recording layer 23 and shown in FIG. 2(a) are concurrently marketed, it is possible to easily discriminate whether an optical recording medium is an optical recording medium 30 or an optical recording medium 20 by in advance ascertaining and storing in the table 15a in the control circuit 15 the level of the alternating current signal B that appears at the second electrode 12 when the first electrode 11 and the second electrode 12 are located at positions close to the light transmission layer 33 of the optical recording medium 30 or positions in contact therewith and the alternating current signal A is applied to the first electrode 11 and the level of an alternating current signal B that appears at the second electrode 12 when the first electrode 11 and the second electrode 12 are located at positions close to the light transmission layer 24 of the optical recording medium 20 or positions in contact therewith and the alternating current signal A is applied to the first electrode 11 as.

Since the circuit constants of the circuit formed between the first electrode 11 and the second electrode 12 by locating the first electrode 11 and the second electrode 12 at positions close to a light transmission layer of an optical recording medium or positions in contact therewith differ depending upon the number of recording layers included in the optical recording medium, the number of recording layers included in the optical recording medium can be discriminated by in advance ascertaining and storing in the table 15a in the control unit 15 the level of the alternating current signal B obtained for each of the optical recording media including different numbers of recording layers.

On the other hand, in the case where an optical recording medium 30 is constituted as a write-once type optical recording medium or a ROM type recording medium, since the reflective layer 34 disposed between the substrate 31 and the intermediate layer 32 corresponds to a conductive layer closest to the surface of the light transmission layer 33 forming the light incidence plane, it is possible to discriminate the number of recording layers 23, 35, 36 included in an optical recording medium 20, 30 by utilizing the difference in the level of the alternating current signal B caused by the difference in the number of recording layers 23, 35, 36 present between the reflective layer 34 and the light transmission layer 33.

In the case where the thickness of the substrate 31 of the optical recording medium 30 is different from that of the substrate 21 of the optical recording medium 20, it is not impossible to discriminate the kind of an optical recording medium 20 30 by locating the first electrode 11 and the second electrode 12 close to the substrate 31 of the optical recording medium 30 or the substrate 21 of the optical recording medium 20, applying the alternating current signal A to the first electrode 11, and detecting the alternating current signal B appearing at the second electrode 12. However, in the case where the difference in the thickness between the substrates 21, 31 is small, it is difficult to accurately discriminate the kind of an optical recording medium. On the other hand, in the case where the thickness of the substrate 31 of the optical recording medium 30 is equal to that of the substrate 21 of the optical recording medium 20, even if the first electrode 11 and the second electrode 12 are located close to the substrate 31 of the optical recording medium 30 or the substrate 21 of the optical recording medium 20, the alternating current signal A is applied to the first electrode 11 and the alternating current signal B appearing at the second electrode 12 is detected, it is impossible to discriminate the kind of an optical recording medium 20 30. However, this embodiment is constituted so as to discriminate the kind of an optical recording medium 20 30 by locating the first electrode 11 and the second electrode 12 at positions close to the surface of the light transmission layer 33 of the optical recording medium 30 or the surface of the light transmission layer 24 of the optical recording medium 20 or positions in contact therewith, applying the alternating current signal A to the first electrode 11, and detecting the alternating current signal B appearing at the second electrode 12. Therefore, since the distance between the light transmission layer 33 and the reflective layer 34 and that between the light transmission layer 24 and the reflective layer 22 are greatly different and the layer configuration between the light transmission layer 33 and the reflective layer 34 and that between the light transmission layer 24 and the reflective layer 22 are also greatly different, it is possible to accurately discriminate the kind of an optical recording medium 20, 30.

Thus, according to this embodiment, the kind of an optical recording medium 20 30 is discriminated by locating the first electrode 11 and the second electrode 12 at positions close to the surface of the light transmission layer 24, 33 on the side opposite from the substrate 21, 31 of the optical recording medium 20, 30 or positions in contact therewith and, therefore, in the case where two or more kinds of next-generation type optical recording media 20, 30 including different numbers of recording layers are marketed concurrently, the time required for recording data in or reproducing data from the optical recording medium 20, 30 after it is set in the data recording and reproducing apparatus can be considerably shortened since it is possible to quickly discriminate the kind of the optical recording medium 20, 30 set in a data recording and reproducing apparatus without conducting the laser beam focusing operation and switching operation of a laser beam.

Figure 6:
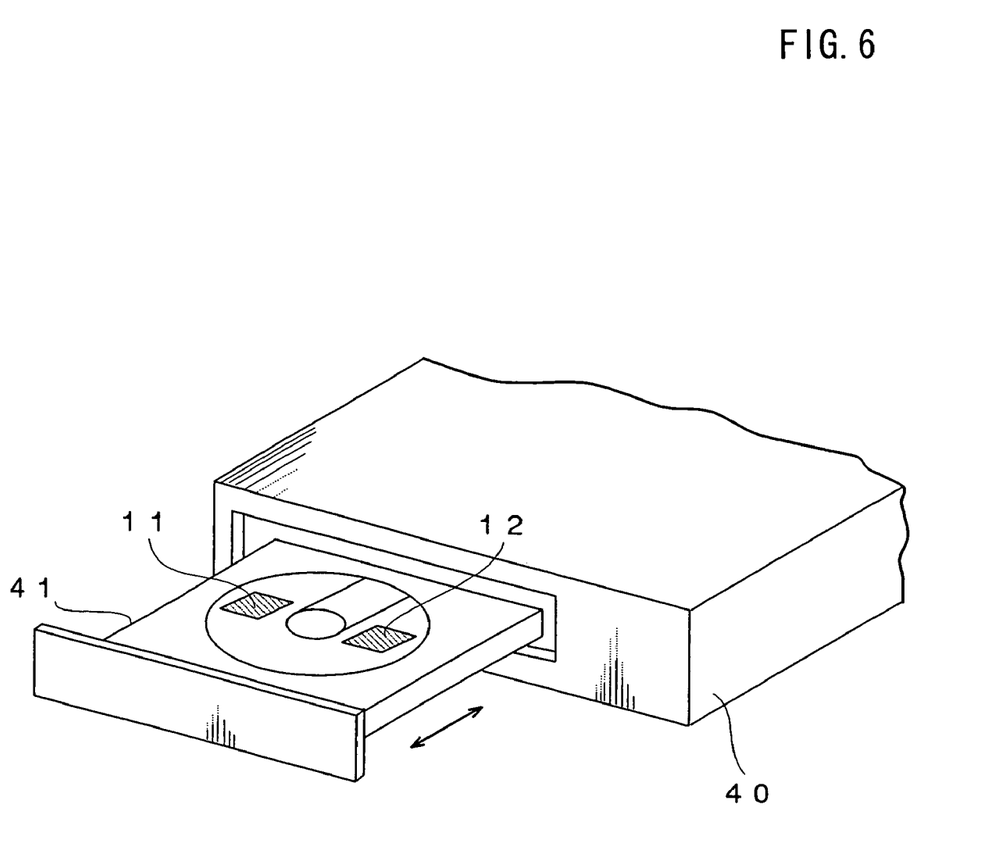
FIG. 6 is a schematic perspective view showing one example of a method for mounting an apparatus for discriminating an optical recording medium that is a preferred embodiment of the present invention on a data recording and reproducing apparatus (drive).

FIG. 6 is a schematic perspective view showing one example of a method for mounting the apparatus 10 for discriminating an optical recording medium according to this embodiment on a data recording and reproducing apparatus (drive).

As shown in FIG. 6, the apparatus 10 for discriminating an optical recording medium is constituted so that it can be accommodated in and discharged from the main body of the data recording and reproducing apparatus 40 and the first electrode 11 and the second electrode 12 are provided on a tray 41 on which an optical recording medium 20, 30 is to be placed, whereby the apparatus 10 for discriminating an optical recording medium according to this embodiment is mounted on the data recording and reproducing apparatus 40. Further, an optical recording medium 20, 30 is placed on the tray 41, thereby locating the first electrode 11 and the second electrode 12 at positions where they are in contact with the surface of the light transmission layer 24, 33 of the optical recording medium 20, 30.

Figure 7:
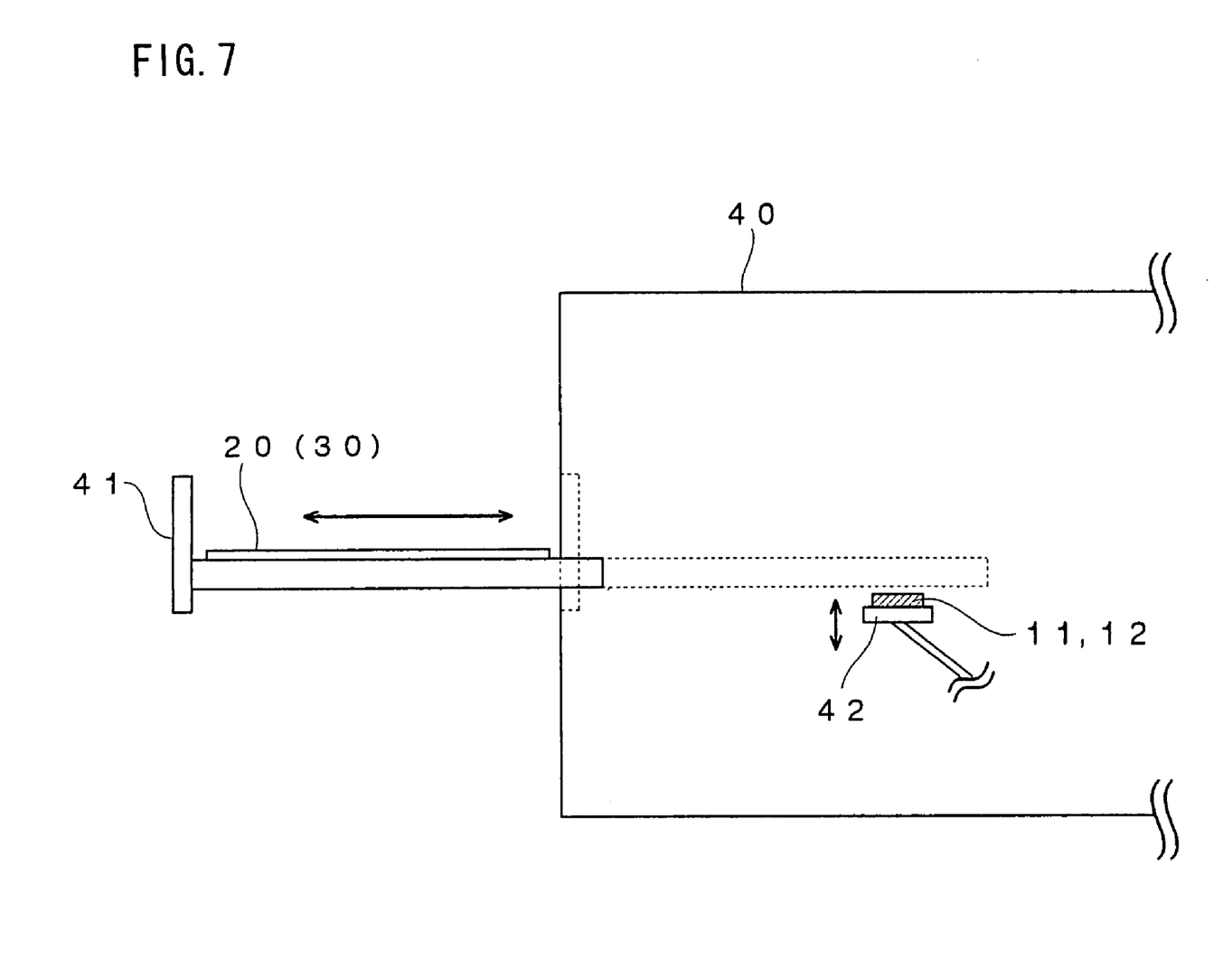
FIG. 7 is a schematic cross-sectional view showing another example of a method for mounting an apparatus for discriminating an optical recording medium that is a preferred embodiment of the present invention on a data recording and reproducing apparatus (drive).

FIG. 7 is a schematic cross-sectional view showing another example of a method for mounting the apparatus 10 for discriminating an optical recording medium according to this embodiment on a data recording and reproducing apparatus (drive).

In FIG. 7, a first electrode 11 and a second electrode 12 are mounted on a top portion of a vertically movable support 42 and the first electrode 11 and the second electrode 12 are located at positions close to the surface of the light transmission layer 24, 33 of the optical recording medium 20, 30 or positions in contact therewith by accommodating a tray 41 on which the optical recording medium 20, 30 is placed in the main body 40 of the data recording and reproducing apparatus and bringing the top portion of the support 42 close to the surface of the light transmission layer 24, 33 of the optical recording medium 20, 30 prior to rotating the optical recording medium 20, 30.

Figure 8:
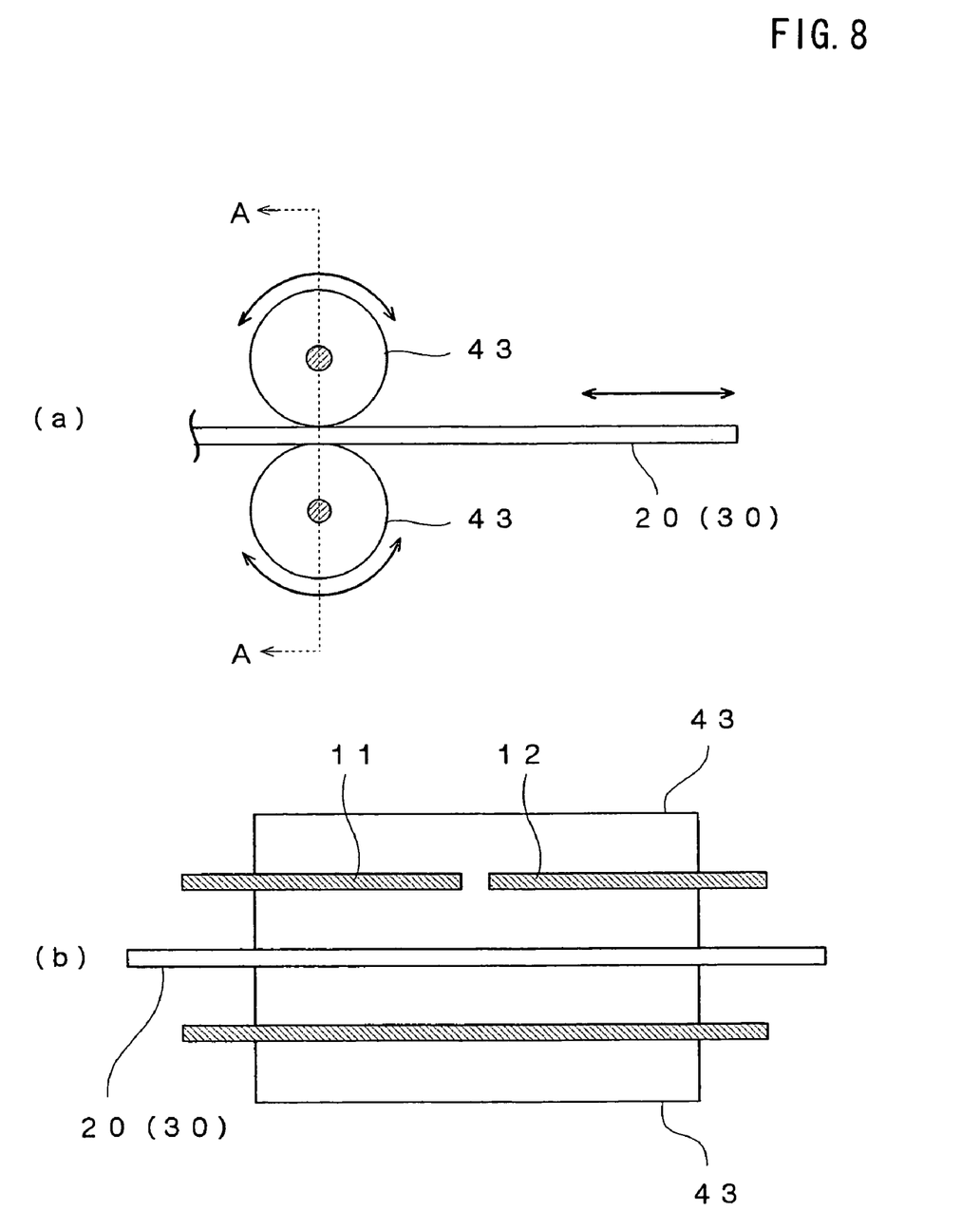
FIG. 8(a) is a schematic longitudinal cross-sectional view showing a further example of a method for mounting an apparatus for discriminating an optical recording medium that is a preferred embodiment of the present invention on a data recording and reproducing apparatus (drive) and FIG. 8(b) is a schematic cross-sectional view taken along a line A—A in FIG. 8(a).

FIG. 8(a) is a schematic longitudinal cross-sectional view showing a further example of a method for mounting the apparatus 10 for discriminating an optical recording medium according to this embodiment on a data recording and reproducing apparatus (drive) and FIG. 8(b) is a schematic cross-sectional view taken along a line A—A in FIG. 8(a).

In this embodiment, a first electrode 11 and a second electrode 12 are constituted by shaft of a roller 43 of a slot-loading type data recording and reproducing apparatus (drive).

The present invention has thus been shown and described with reference to specific embodiments. However, it should be noted that the present invention is in no way limited to the details of the described arrangements but changes and modifications may be made without departing from the scope of the appended claims.

For example, in the above described embodiments, although the kind of an optical recording medium 20, 30 is discriminated by employing the first electrode 11 and the second electrode 12 and detecting an alternating current signal B appearing at the second electrode 12 when an alternating current signal A is applied to the first electrode 11, it is possible to discriminate the kind of an optical recording medium 20, 30 by employing a planar-coil like electrode and detecting an eddy current generated by supplying an electrical current to the planar-coil like electrode.

According to the present invention, since the kind of a next-generation type optical recording medium can be quickly discriminated in the case where two or more kinds of next-generation type optical recording media are concurrently in use, it is possible to markedly shorten the time required for actually recording data in or reproducing data from the optical recording medium after the optical recording medium is set in a data recording and reproducing apparatus.

The invention claimed is:

1. An apparatus for discriminating an optical recording medium and the number of recording layers in the medium, the medium having a light transmission layer, the apparatus for discriminating an optical recording medium comprising:
   a first electrode and a second electrode which can be disposed in the vicinity of a surface of the light transmission layer;
   a means for applying a signal to the first electrodes; and
   a means for detecting a signal representative of the number of recording layers appearing at the second electrode.

2. An apparatus for discriminating an optical recording medium constituted so as to be able to discriminate between a first kind of optical recording medium having light transmission layer of a first material and a second kind of optical recording medium having a light transmission layer of a second material, the apparatus for discriminating optical recording media comprising;
   a first electrode and a second electrode which can be disposed in the vicinity of a surface of the light transmission layer disposed on a side opposite from the substrate side;
   a means for applying a signal to the first electrodes; and
   a means for detecting a signal representative of the number of recording layers in the optical recording medium appearing at the second electrode.

3. An apparatus for discriminating an optical recording medium comprising at least a substrate, at least one recording layer formed on the substrate and a light transmission layer formed on the recording layer constituted so as to be able to discriminate the number of the recording layers included in an optical recording medium, the apparatus for discriminating an optical recording medium comprising a first electrode and a second electrode which can be disposed in the vicinity of a surface of the light transmission layer disposed on a side opposite from the substrate side, a means for applying a signal to the first electrode, and a means for detecting a signal appearing at the second electrode.

4. A method for discriminating the number of recording layers in an optical recording medium comprising at least a substrate, a conductive layer formed on the substrate and a light transmission layer formed on the conductive layer, the method for discriminating optical recording media comprising:
   disposing a first electrode and a second electrode in the vicinity of a surface of the light transmission layer disposed on a side opposite from the substrate side;
   applying a signal to the first electrode;
   and detecting a signal appearing at the second electrode, that indicates the number of recording layers that are in the medium.

5. A method for discriminating the number of recording layers in an optical recording medium constituted so as to be able to discriminate between a first kind of optical recording medium having a light transmission layer of a first material and a second kind of optical recording medium having light transmission layer of a second material, the method for discriminating an optical recording medium comprising:
   disposing a first electrode and a second electrode in the vicinity of a surface of the light transmission layer disposed on a side opposite from the substrate side;
   applying a signal to the first electrode; and
   detecting a signal appearing at the second electrode, that discriminates whether an optical recording medium has more than one recording layers.

6. A method for discriminating an optical recording medium comprising at least a substrate, at least one recording layer formed on the substrate and a light transmission layer formed on the recording layer, which is constituted so as to be able to discriminate the number of the recording layers of an optical recording medium, the method for discriminating an optical recording medium comprising steps of disposing a first electrode and a second electrode in the vicinity of a surface of the light transmission layer disposed on a side opposite from the substrate side, applying a signal to the first electrode, and detecting a signal appearing at the second electrode, thereby discriminating the number of the recording layers included in an optical recording medium.

7. A method for determining the type of an optical recording medium, comprising:
   placing a first electrode and a second electrode in the vicinity of a light transmission layer of the optical recording medium;
   applying a signal to the first electrode; and
   detecting a signal on the second electrode representative of whether there is more than one recording layer in the optical recording medium.

8. The method according to claim 7 wherein the detecting step includes detecting the number of layers of recording medium.

9. An apparatus for determining the type of an optical recording medium, comprising:
   a first electrode and a second electrode placed in the vicinity of a light transmission layer of the optical recording medium;
   a circuit that applies a signal to the first electrode; and
   a circuit that detects a signal representative of the number of recording layers in the optical recording medium appearing at the second electrode.

* * * * *

UNITED STATES PATENT AND TRADEMARK OFFICE
CERTIFICATE OF CORRECTION

PATENT NO.        : 7,200,084 B2
APPLICATION NO.   : 10/511623
DATED             : April 3, 2007
INVENTOR(S)       : Takashi Namioka et al.

Page 1 of 1

It is certified that error appears in the above-identified patent and that said Letters Patent is hereby corrected as shown below:

Column 13
Line 38, "having" should read as --having a--.

Column 14
Line 26, "layers" should read as --layer--.

Signed and Sealed this

Twenty-first Day of April, 2009

JOHN DOLL
*Acting Director of the United States Patent and Trademark Office*